United States Patent
Warlick, III et al.

(10) Patent No.: US 7,204,538 B2
(45) Date of Patent: Apr. 17, 2007

(54) SLIDING STORAGE COMPARTMENT

(75) Inventors: Arthur G. Warlick, III, Sturgis, MI (US); Michael R. Terlep, Jr., Bristol, IN (US); Robert R. Bradley, Granger, IN (US); Gary L. Duncan, Middlebury, IN (US)

(73) Assignee: Coachmen Recreational Vehicle Company, LLC, Middlebury, IN (US)

( * ) Notice: Subject to any disclaimer, the term of this patent is extended or adjusted under 35 U.S.C. 154(b) by 0 days.

(21) Appl. No.: 11/288,025

(22) Filed: Nov. 28, 2005

(65) Prior Publication Data

US 2006/0158000 A1  Jul. 20, 2006

Related U.S. Application Data

(60) Provisional application No. 60/631,313, filed on Nov. 29, 2004.

(51) Int. Cl.
*B60R 5/02* (2006.01)
(52) U.S. Cl. .................... 296/37.1; 224/488; 224/510; 224/518; 224/554
(58) Field of Classification Search .............. 296/37.1, 296/37.6; 224/400, 402, 403, 404, 488, 495, 224/510, 511, 518, 517, 539, 554, 566, 571, 224/519, 520
See application file for complete search history.

(56) References Cited

U.S. PATENT DOCUMENTS

| 4,917,430 | A | * | 4/1990 | Lawrence ................... 296/37.6 |
| 4,993,771 | A | * | 2/1991 | Ingerson et al. ........... 296/37.6 |
| 5,730,344 | A | * | 3/1998 | Mauch ....................... 224/402 |
| 5,895,086 | A | * | 4/1999 | Carico ........................ 296/37.6 |
| 5,979,972 | A | * | 11/1999 | Gehman ...................... 296/173 |
| 6,056,177 | A | * | 5/2000 | Schneider .................... 224/401 |
| 6,814,384 | B2 | * | 11/2004 | Grafton ...................... 296/37.6 |
| 7,032,956 | B2 | * | 4/2006 | Gehman et al. ............ 296/168 |
| 7,048,320 | B2 | * | 5/2006 | Rubel et al. ................ 296/37.6 |

* cited by examiner

*Primary Examiner*—Jason Morrow
(74) *Attorney, Agent, or Firm*—Whyte Hirschboeck Dudek SC

(57) ABSTRACT

The invention provides a moveable storage compartment designed for camper trailers that provides for top access even when the camper is in use and is folded out and over the top of the compartment. The storage compartment's unique design and placement on a sliding track allow the user to move the compartment to either side of the trailer in a direction substantially perpendicular to a line running along the length of the trailer. Furthermore, the compartment has one or more lids that allow either side to be accessed depending upon on which side of the trailer access is desired. At least one lid of the compartment may easily convert for use as a table if desired.

20 Claims, 6 Drawing Sheets

SLIDING STORAGE COMPARTMENT

CROSS-REFERENCE TO RELATED APPLICATIONS

This application claims priority under 35 U.S.C. §119(e) to U.S. Provisional Patent Application No. 60/631,313, filed Nov. 29, 2004, the entirety of which is incorporated by reference herein.

BACKGROUND OF THE INVENTION

The present invention relates to a sliding storage compartment and, in particular, a storage compartment attached to a camping trailer or other vehicle and designed to slide along a track for easier access and use.

On folding camper trailers or other vehicles, there may be a stationary locking resin or plastic compartment (also referred to as a "box") on the back or front of the unit for storage. One problem with the design of these storage compartments of the prior art is that when the camper is open and in use with the bunks folded out, the storage compartment is not accessible from the top. Some compartments seen in the prior art may provide a side door for side access. However, since the compartment may be quite long, extending along the entire width of the camper, it is difficult to access the entire compartment from a side door. Furthermore, due to the angle of access and lack of light entering into the compartment generally from the side, it is difficult for the user to easily view the inside and contents of the compartment from a side door. Accordingly, there is a need for a storage compartment for a camper which is easily accessible throughout the compartment, preferably from the top of the compartment, even when the camper is open and the bunks over the back and front of the camper are folded out.

SUMMARY OF THE INVENTION

The invention, which is defined by the claims set out at the end of this disclosure, is intended to solve at least some of the problems noted above. A storage compartment is provided. The storage compartment includes a compartment having one or more openings on top of the compartment. The compartment is moveable from a first position to a second position in a direction substantially perpendicular to a line running along a length of a vehicle on which the compartment is installed. At least one lid covers the opening. The storage compartment is slidably moveable with a slide mechanism.

The slide mechanism includes a first member attached to the compartment and a second member slidably mounted on the first member. The second member is attached to the vehicle to connect the storage compartment to the vehicle. In one embodiment, the first member is a track, which can be attached to a frame of a vehicle, and the second member is a slide rail. A fastener, such as a latch, can be used to restrict movement of the storage compartment relative to the vehicle. A locking mechanism can lock the storage compartment in position with respect to the vehicle.

The lids are hingedly attached to the compartment. At least one of the lids can be pivoted about 180 degrees to provide a table formed by the underside of the lid. One or more supports can be used to retain the lid in a pivoted position.

A method of storing and accessing materials in a storage compartment is also provided. In the method, the storage compartment is attached to a vehicle. The storage compartment is moved from a first position to a second position in a direction substantially perpendicular to a line running along a length of the vehicle. The storage compartment can also be moved to the second position, such as away from the vehicle on which it is installed. When the storage compartment is in the second position, a first lid of the storage compartment can be opened. The lid can be pivoted about 180 degrees to form a table. Once pivoted, the lid can be supported in the pivoted position.

The storage compartment can be moved from the second position to a third position in a direction substantially perpendicular to a line running along a length of the vehicle. In the third position, a second lid of the storage compartment can be opened. The storage compartment can be retained in one of the positions and can also be locked in that position.

The sliding storage compartment of the present invention satisfies the need of an adequately accessible storage compartment by providing a compartment having a slideable feature so that the compartment may slide in a direction along the camper width and substantially perpendicular to a line drawn through the center and along the length of the camper trailer. The compartment is slideable for a distance sufficiently beyond the trailer width edges on either side thereof at the user's option, so that a top lid of the compartment may be opened even when the camper is open and in use. The sliding storage compartment is preferably situated in front of the camper on the trailer and behind the tow hitch mechanism. However, it could be alternatively situated on the rear of the unit or some other location.

Figure 1:
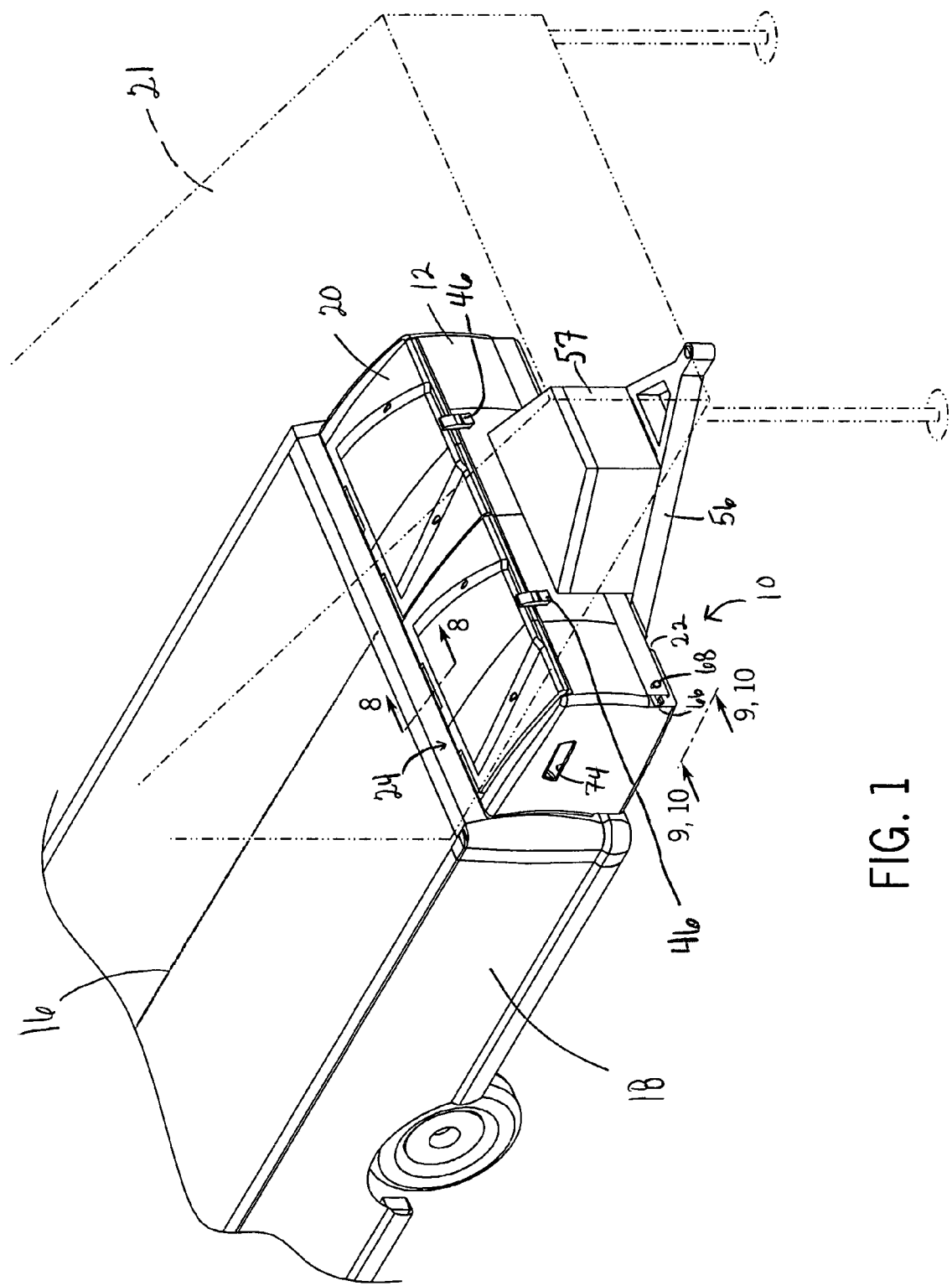
FIG. 1 is an isometric view of a sliding storage compartment made in accordance with an embodiment of the invention, with the sliding storage compartment situated on a front of a camper trailer, which is shown with a pop up tent of the camper trailer in phantom.
Figure 2:
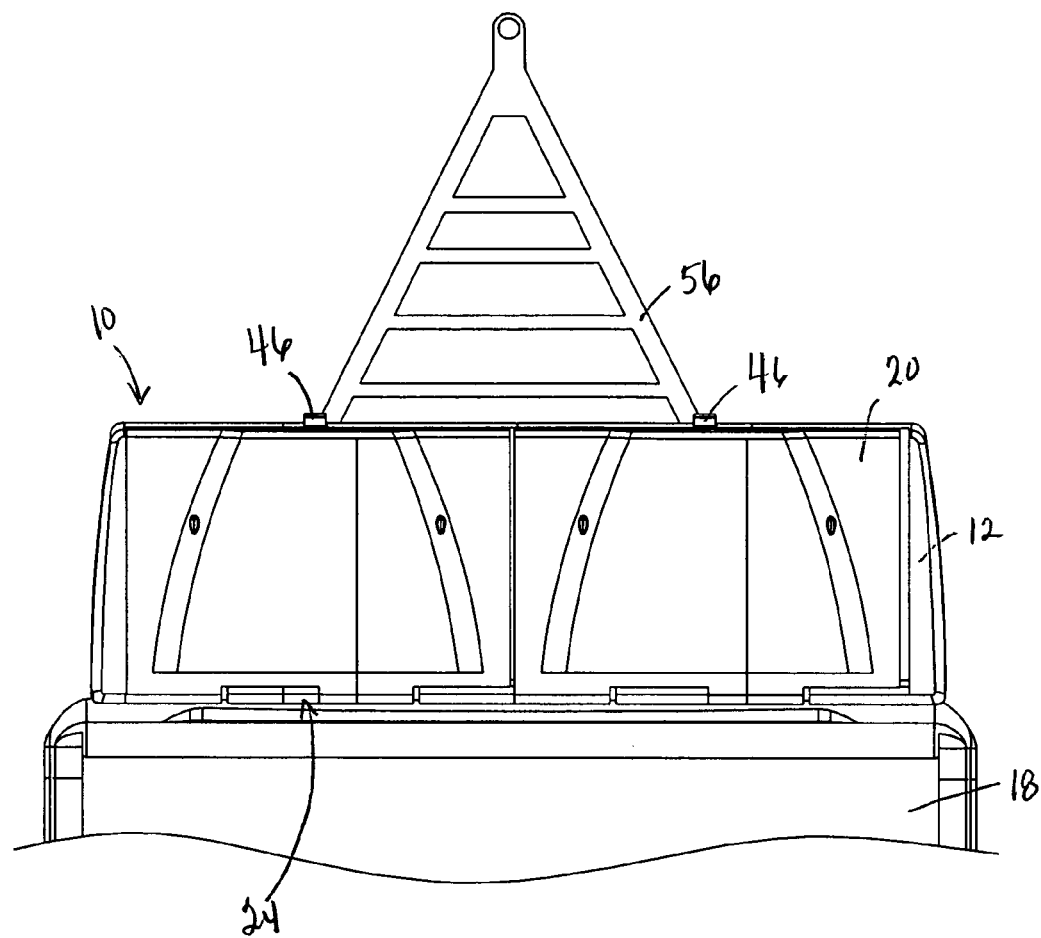
FIG. 2 is a top plan view of the sliding storage compartment of FIG. 1.
Figure 3:
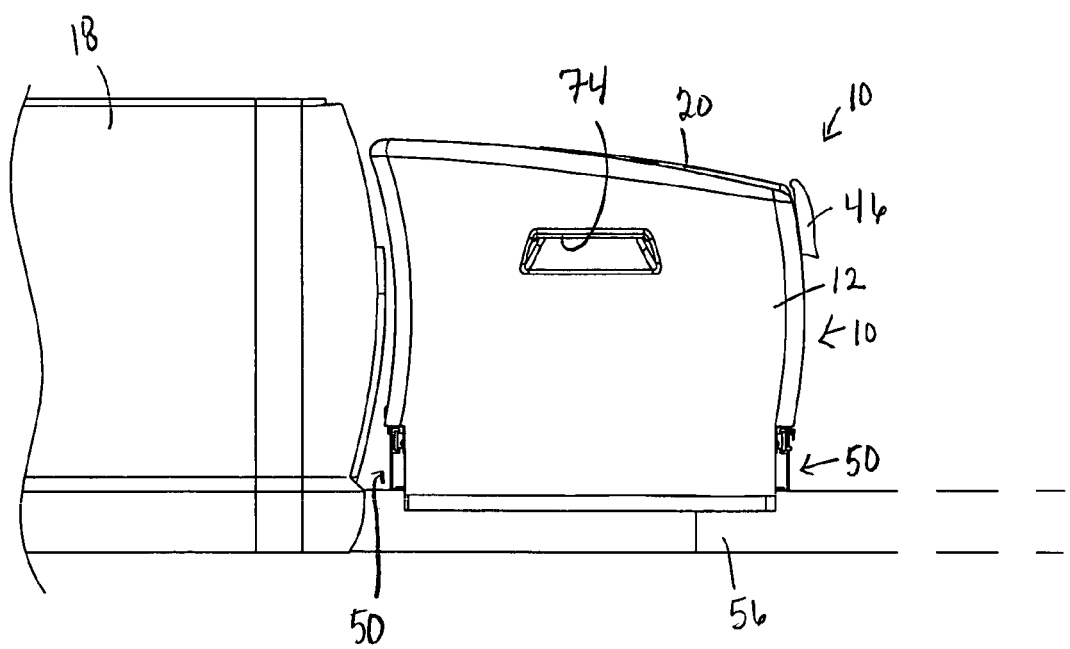
FIG. 3 is a side elevation view of the sliding storage compartment of FIG. 1.

Before explaining embodiments of the invention in detail, it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENT

Referring to FIGS. 1–5, a sliding storage compartment 10 includes a compartment 12 having one or more openings 14 on a top of the compartment 10. The compartment 12 is moveable from a first position to a second position in a direction substantially perpendicular to a line 16 running along a length of a vehicle 18, such as a camper trailer 18, on which the compartment 12 is installed. One or more lids 20 cover one or more openings 14 in the compartment 12. As is explained below, an advantage to this sliding storage compartment 10 is evident in particular with camper trailers 18 having one or more pop up tents 21, as is shown in phantom in FIG. 1, although this sliding storage compartment 10 could be useful in other applications. For example, the compartment 10 could be useful in multiple internal or external recreational vehicle uses, travel trailers or motor homes. The sliding compartment 10 could incorporate a storage center, outdoor center for children, entertainment center with a television or other entertainment center under a lid 20, or a slide out kitchen center. It is intended that all possible applications be included in the description of the invention.

In one embodiment, the sliding storage compartment 10 is a rotocast one-piece compartment manufactured of linear low density polyethylene resin. However, the compartment can be manufactured from other materials and may be manufactured from more than one piece. The sliding storage compartment 10 is generally rectangular in shape. The sliding storage compartment 10 can be contoured for purposes of stiffness and to increase structural strength. Semi-circular channels 22 in a bottom of the compartment 12 can be included as stiffening ribs to add rigidity. The channels 22 could be of different lengths also.

In one embodiment, the sliding storage compartment 10 is about 82.25 inches in length and about 24 inches in width, having a storage capacity of 23.7 cubic feet. The sliding storage compartment 10 preferably has a back height of about 24 inches and a front height of about 21 inches, although such dimensions are not intended to be limiting. The sliding storage compartment 10 is designed to be easy and inexpensive to manufacture and to be hardy and weather resistant in use. It is also designed to provide maximum storage capacity and maximum accessibility and multipurpose use. In one embodiment, the load capacity of the sliding storage compartment 10 is about 250 pounds.

In one embodiment, two lids 20 are symmetrical in size and shape and configured in a manner to optimize strength and durability and to protect the contents of the compartment 12 from moisture or other elements of nature. However, the compartment 12 does not need to have two or more openings 14 and could only have one lid 20 covering it or a portion of the compartment 12. In addition, where multiple lids 20 are present, they need not be symmetrical in size and shape and configured in a manner to optimize strength and durability and to protect the contents of the compartment from moisture or other elements of nature. The compartment 12 may be accessed through either top lid 20 by sliding the compartment 12 sufficiently in one direction or the other so that one or the other of the top lids 20 may be pivoted away from the compartment 12 and opened. The interior of the compartment 12 is thereby exposed for easy view and inspection by the user.

Figure 8:
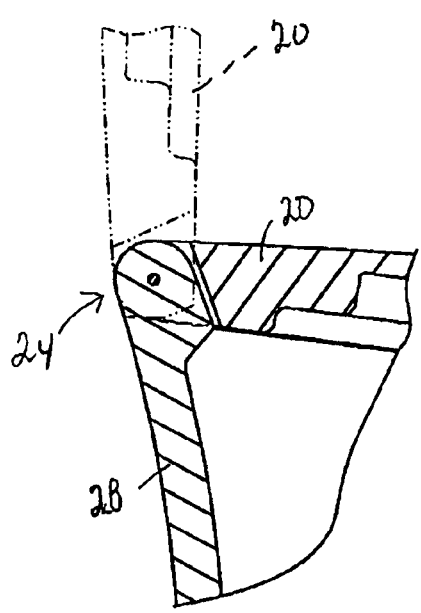
FIG. 8 is a detailed cross-sectional view taken along line 8—8 of FIG. 1 of a hinge mechanism of the sliding storage compartment of FIG. 1, showing a lid in phantom in an open position.

Each lid 20 may be locked in place when in closed position with keyed access to prevent unauthorized access to the compartment contents. As can best be seen in FIGS. 4 and 8, each lid 20 is attached to the compartment by a hinge mechanism 24 extending along the length thereof, forming an axis of attachment between the compartment 12 and the lid 20. Each lid 20 is pivotable around its axis of attachment with the compartment 12 in a direction away from the compartment 12. When the compartment 12 is in an accessible position when the camper trailer 18 is open and unfolded, the lid 20 of the compartment 12 on the side that has been sufficiently extended beyond the width of the camper trailer 18 to allow free pivoting of the lid 20 may be pivoted to a position about 180 degrees from the closed position. In a preferred embodiment, each of the lids 20 has a hinge mechanism 24 that is integrated with the storage compartment 10. The hinge 24 has a built-in safety feature that causes it to "bottom out" on itself when rotated just past the horizontal (180°) position, making the lids 20 unable to rotate much beyond this position.

Figure 7:
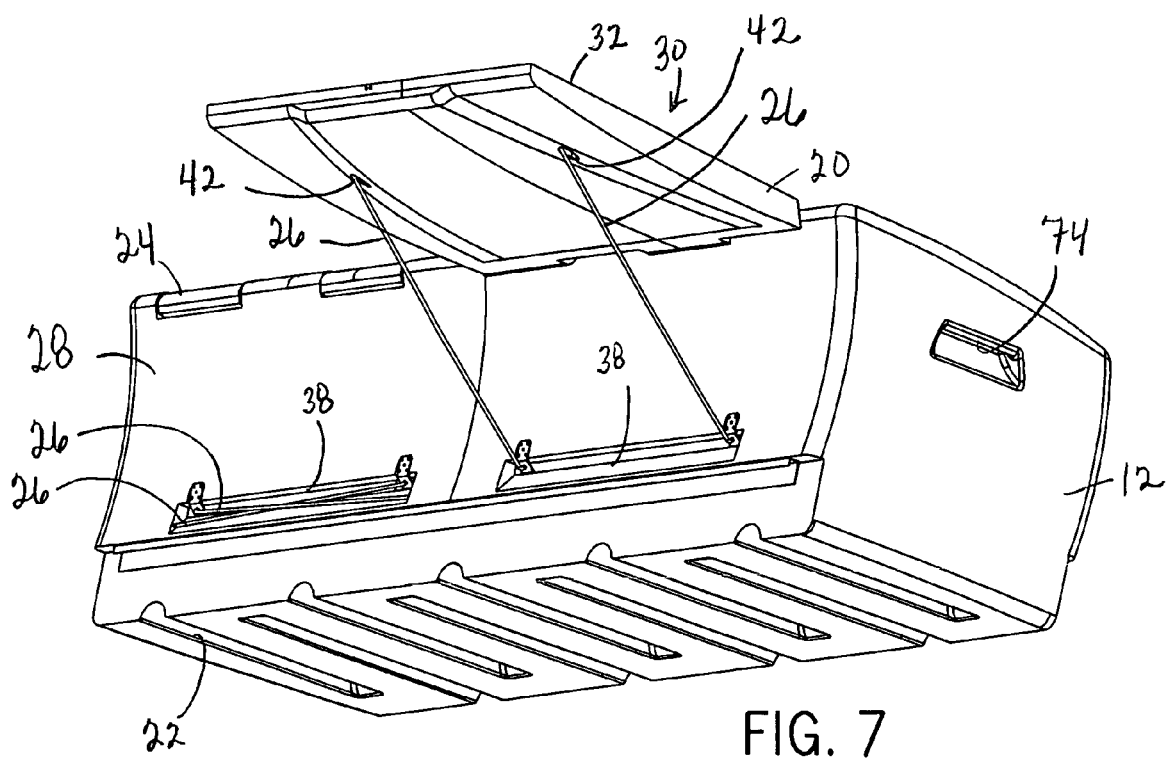
FIG. 7 is an isometric view from a rear side of the sliding storage compartment of FIG. 1, showing the second lid of the sliding storage compartment in a substantially horizontal position with supports holding the second lid in the substantially horizontal position.

When in the rotated position, referring now to FIG. 7, the lids 20 may be placed on supports 26, such as steel rods 26, attached to and stored in a back 28 of the compartment 12 to provide for a table 30 secured by such supports 26 and created from the flat surface of an underside 32 of the lid 20. If desired, the compartment 12 may be moved to the opposite side of the camper trailer 18, where the other lid 20 may be alternatively pivoted and used as a table 30 in the same manner.

Each steel rod 26 may be stored in a depression 38 on the back 28 of the compartment 12. The steel rods 26 are pivotally attached to the back 28 of the compartment 12 and fold and store within the depression 38. When the steel rods 26 are desired for support, they can be pivoted out and up to support the inner lid surface as a table 30 by placing the outer and unattached ends thereof in two indentations 42 in the outer top of each lid 20. Each support rod 26 is attached in the depression 38 of the compartment 12 so that, when they are not in use, they will stay firmly in place.

Figure 6:
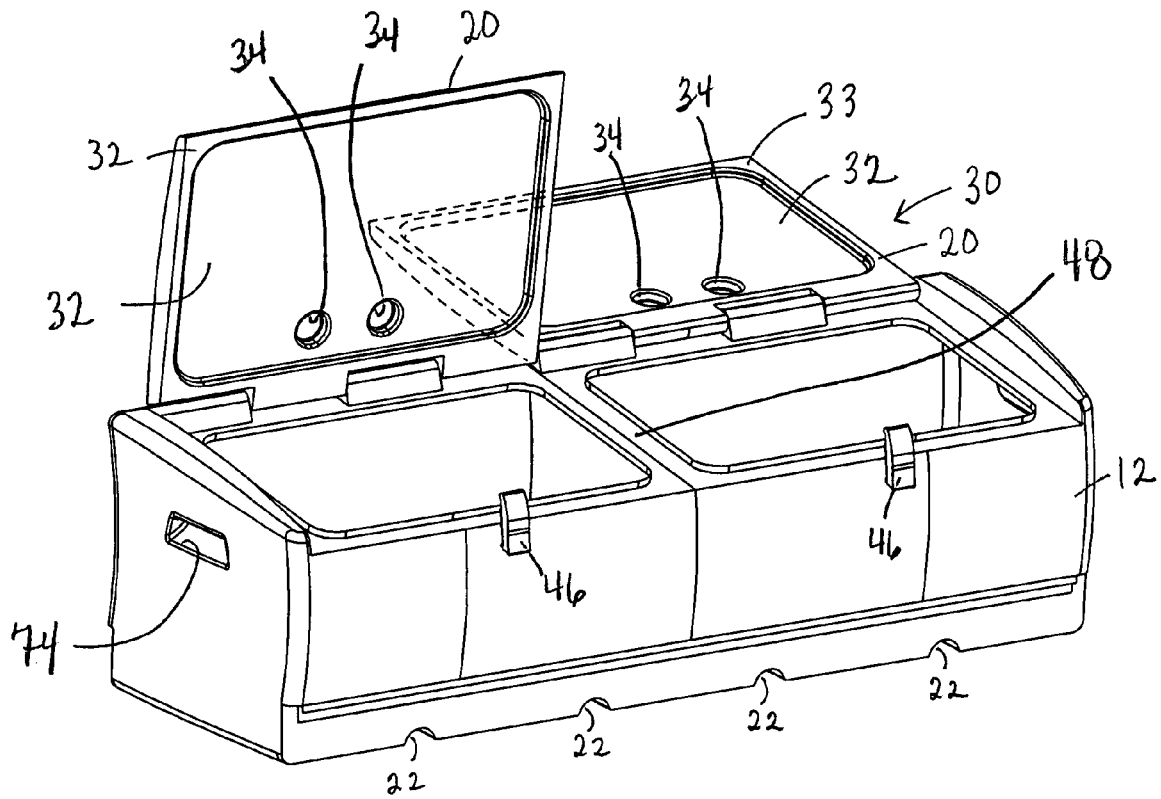
FIG. 6 is an isometric view from a front side of the sliding storage compartment of FIG. 1, showing a first lid of the sliding storage compartment in an open position with the first lid being substantially vertical and a second lid of the sliding storage compartment in an open position with the second lid being substantially horizontal such that it can be used as a table.

As shown in FIG. 6, the table 30 that is formed from the lid 20 includes useful features. For example, an outer generally rectangular lip 33 is provided on the inside of each lid 20, as well as two indentations 34 in the lid 20 intended for use as cup holders, if desired, in a size and generally round shape for this purpose. Each lid 20 further has a seal (not shown) around the edge thereof for the purpose of keeping moisture out of the compartment 12. The front of each side of the compartment 12 further has locking latches 46 that can be locked with a key (not shown) for purposes of security.

Figure 4:
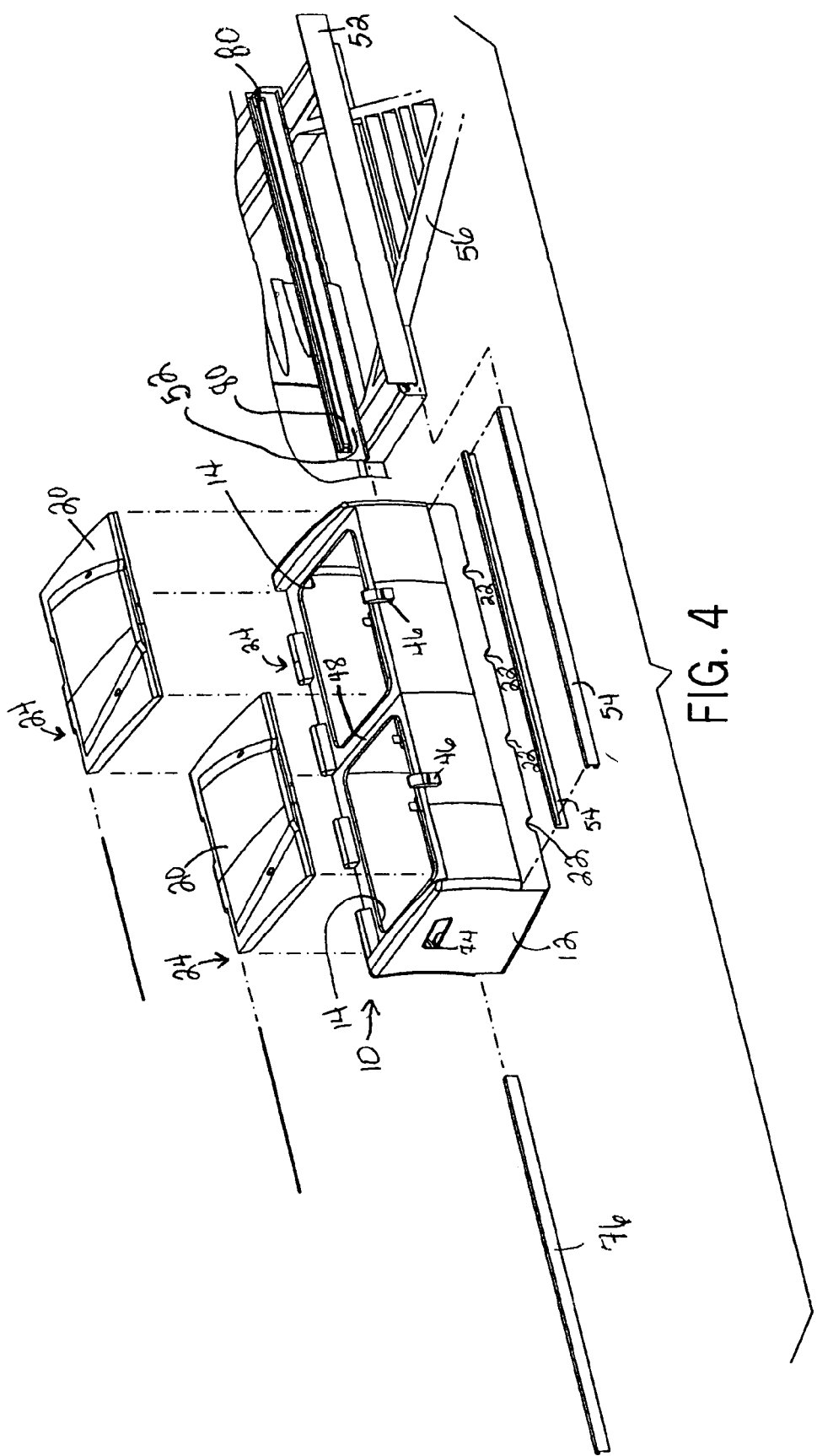
FIG. 4 is an exploded view of the sliding storage compartment of FIG. 1.

It should be noted that in one embodiment, the compartment 12 is divided on its upper surface into two identical openings 14 with an integrally molded middle surface divider 48, as can be seen in FIGS. 4 and 6. In this embodiment, each opening 14 is covered by two identical lids 20 made from the same material as the compartment 12, each lid 20 is contoured on the outside for physical strength and appearance and is generally flat on the inside surface, and the hinge mechanisms 24 are substantially identical on each side.

Figure 5:
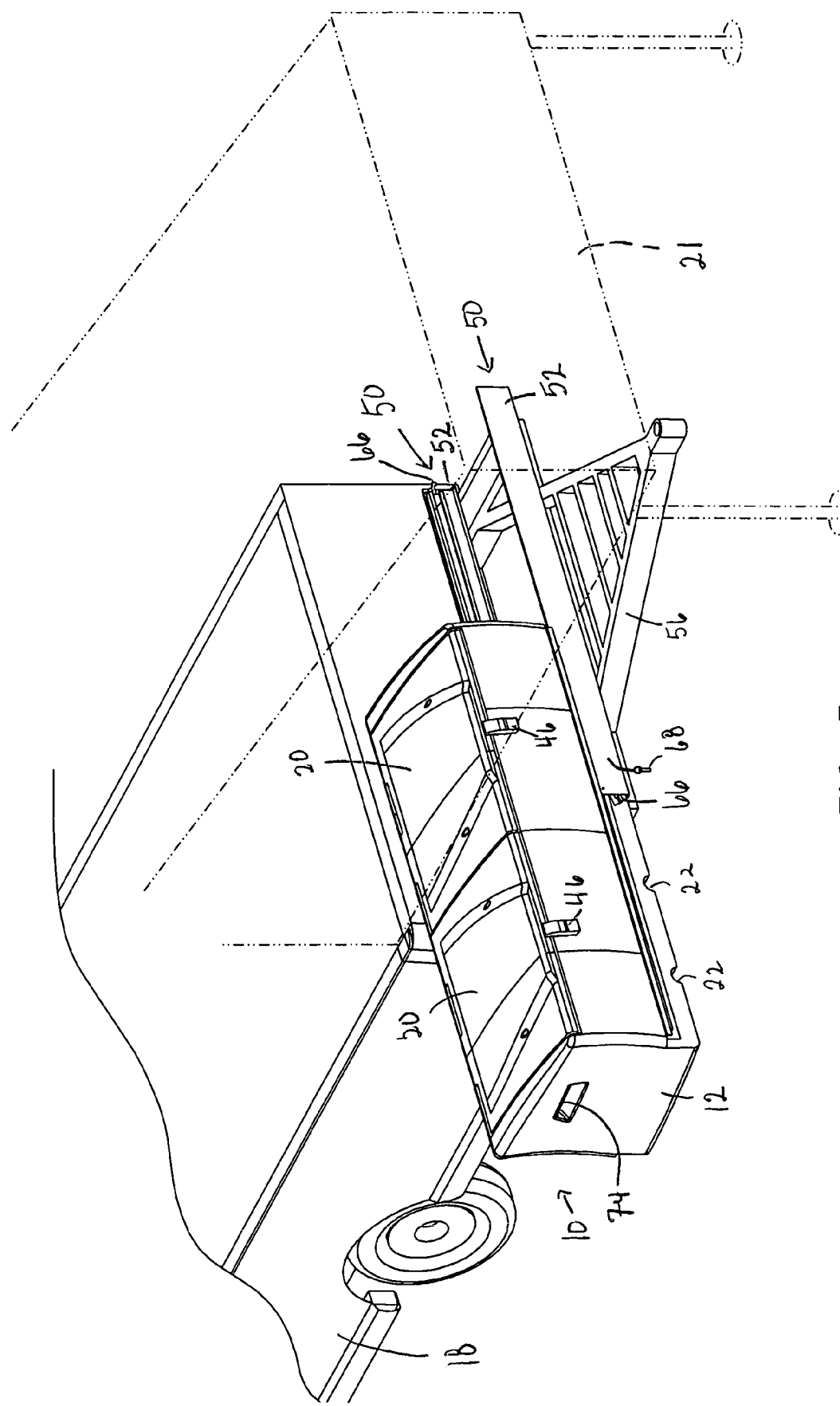
FIG. 5 is an isometric view of the sliding storage compartment of FIG. 1, showing the sliding storage compartment moved into a second position in a direction substantially perpendicular to a line running along the length of the vehicle from the camper trailer.
Figure 9:
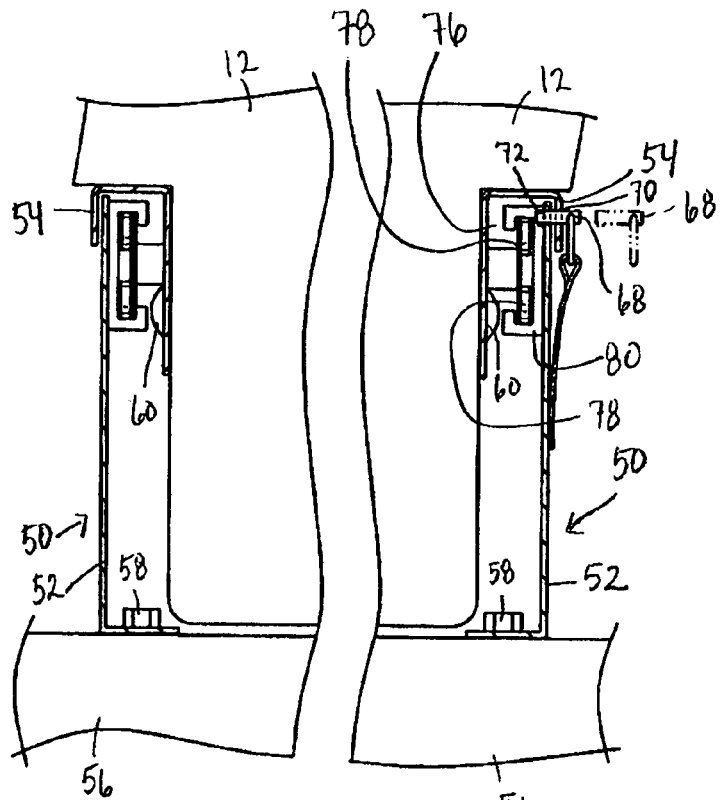
FIG. 9 is a cross-sectional view taken along line 9—9 of FIG. 1 of the sliding storage compartment of FIG. 1, showing a slide mechanism of the sliding storage compartment.

Referring to FIGS. 4 and 5, the sliding storage compartment 10 is removably affixed to the camper trailer 18 by a slide mechanism 50 that includes a first member 52 and a second member 54. In one embodiment, the first member 52 is a track 52, and the second member 54 is a slide rail 54, which is received in the track 52. The track 52 is attached to a frame 56 on a front of the camper trailer 18. In one embodiment, the sliding storage compartment 10 extends along the front width of the trailer 18. Where the frame 56 includes a unit 57 (FIG. 1) for storing propane tanks (not shown), the track 52 can be attached between the camper trailer 18 and the storage unit 57. The track 52 can be attached to the frame 56 with bolts 58, as is shown in FIG. 9. The slide rail 54 is attached to the compartment 12 such as by connecting it with rivets 60, as is shown in FIG. 9.

Figure 10:
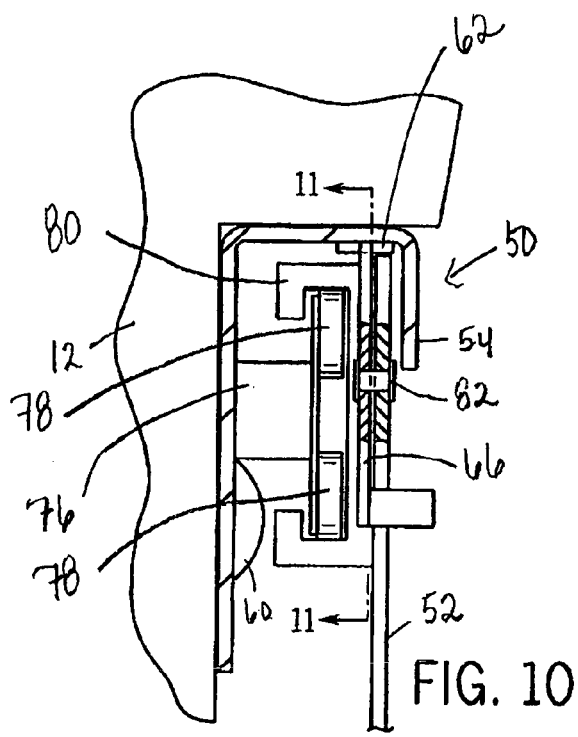
FIG. 10 is a cross-sectional view taken along line 10—10 of FIG. 1 of the sliding storage compartment of FIG. 1, showing a slide mechanism of the sliding storage compartment.
Figure 11:
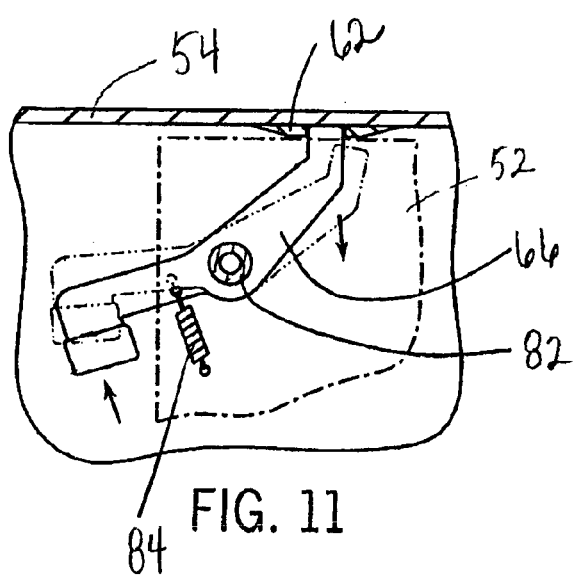
FIG. 11 is a cross-sectional view taken along line 11—11 of FIG. 10 of the sliding storage compartment of FIG. 1, showing a slide mechanism of the sliding storage compartment.

Referring now to FIGS. 10 and 11, the slide rail 54 includes a wheel carriage 76 bearing two wheels 78. The wheels 78 rest on a C-channel bracket 80 mounted on the track 52 and retains the wheels 78 therein. The wheels 78 roll in the C-channel bracket 80 and permit the compartment 12 to slide along the track 52 attached to the trailer frame 56. The track 52 and slide rail 54 can be made from steel or other suitable material.

The track 52 includes projections 62, such as bump out stops 62, which can be made from nylon or other suitable material. An outside edge of the track 52 includes a fastener, such as a latch 66, that is mounted on the track 52 by a pin 82 or the like. The fastener 66 is received in one of the bump out stops 62 to retains the sliding storage compartment 10 in locked position. A biasing element 84, such as a spring 84, biases the latch 66 toward the bump out stop 62. Depression of the latch 66 allows sliding to continue in the desired direction. In one embodiment, the slide mechanism 50 is preferably 75.5 inches long, and the compartment 12 is capable of sliding a total of 50.5 inches or 67% of its total length in either direction, where it can be locked in position by another bump out stop 62 in the track 52. When the camper trailer 18 is in motion, the sliding storage compartment 10 is locked in a fixed position. For example, a fastener 68, such as a locking pin 68 or a padlock, is installed in a hole 70 in the track 52 and a hole 72 in the slide rail 54 when the camper trailer 18 is in motion to further prevent sliding of the sliding storage compartment 10 when the camper trailer 18 is in transit. If desired, the latch 66 can be depressed to fully remove the sliding storage compartment 10 from the track.

In a preferred embodiment, when the camper trailer 18 is stationary and open and the user desires to access the sliding storage compartment 10, the user has the option of sliding the sliding storage compartment 10 in either direction along the track 52 in order to open one or the other of the lids 20 of the sliding storage compartment 10. For instance, FIG. 5 shows the sliding storage compartment 10 moved to one side of the camper trailer 18. In order to move the sliding storage compartment 10 along the track 52, the latch 66 must be depressed. This allows the sliding storage compartment 10 to move slightly more than half way in one direction or the other to either side of the camper trailer 18. This movement in either direction allows one of the lids 20 to be completely accessible beyond the width of the trailer camper 18 so that it may be opened completely by pivoting the lid 20 about 180 degrees to a generally horizontal position with the underside of the lid 20 facing up. However, other embodiments of this invention include an embodiment where the sliding storage compartment 10 slides out to the side of the camper trailer 18 in only one direction and then back to its original position along the front width of the camper trailer 18. Alternatively, the storage compartment 10 could have only one lid 20 that could open, could be slidable in only one direction to allow access to the one lid 20 that can be opened, or could have only one lid 20 that could convert into a table.

The sliding storage compartment 10 also provides for molded indentations 74 on each opposite shorter side thereof to provide a grip handle 74 to slide and/or lift the compartment 12. The compartment 12 is fully detachable from the camper trailer 18, if desired, by use of the latch 66.

The sliding storage compartment 10 is accessible even when the camper trailer 18 is open and unfolded. Ordinarily, the tent 21 of the trailer camper 18 where a bunk (not shown) is located would be covering the sliding storage compartment 10 making lid entry inaccessible. The sliding storage compartment 10 is configured so that the generally entire length of the sliding storage compartment 10 is accessible from either opening 14. The openings 14 in the top of the compartment allow entry to the sliding storage compartment 10. Once the compartment 12 is extended as a first step beyond the width of the camper trailer 18, it can further be removed and detached, if desired, by suppressing the latch 66 further.

It is understood that the various preferred embodiments are shown and described above to illustrate different possible features of the invention and the varying ways in which these features may be combined. Apart from combining the different features of the above embodiments in varying ways, other modifications are also considered to be within the scope of the invention.

The invention is not intended to be limited to the preferred embodiments described above, but rather is intended to be limited only by the claims set out below. Thus, the invention encompasses all alternate embodiments that fall literally or equivalently within the scope of these claims

What is claimed is:

1. A storage compartment comprising:
    a compartment having one or more openings on a top of the compartment, the compartment being moveable with a slide mechanism from a first position to a second position in a direction substantially perpendicular to a line running along a length of a vehicle on which the compartment is installed, the vehicle having a frame;
    at least one lid covering the openings; and wherein the slide mechanism attaches the storage compartment to the frame of the vehicle.

2. The storage compartment of claim 1, wherein the storage compartment is slidably moveable with the slide mechanism.

3. The storage compartment of claim 2, wherein the slide mechanism comprises:
    a first member attached to the compartment; and
    a second member slidably mounted on the first member and attached to the vehicle to connect the storage compartment to the vehicle.

4. The storage compartment of claim 3, the first member comprising a track, and the second member comprising a slide rail.

5. The storage compartment of claim 4, wherein the track is attached to the frame of the vehicle.

6. The storage compartment of claim 3, wherein the storage compartment is removably attached to the slide mechanism.

7. The storage compartment of claim 4, further comprising a fastener that restricts movement of the storage compartment relative to the vehicle.

8. The storage compartment of claim 7, further comprising a locking mechanism that locks the storage compartment in position with respect to the vehicle.

9. The storage compartment of claim 1, wherein at least one of the openings is covered by a lid and the lid is hingedly attached to the compartment.

10. The storage compartment of claim 9, wherein at least one of the lids can be pivoted at least 180 degrees.

11. The storage compartment of claim 10, further comprising a support that retains the lid in a pivoted position.

12. The storage compartment of claim 10, wherein the lid includes a raised perimeter and cup holders on the undersides thereof.

13. A method of storing and accessing materials in a storage compartment, the method comprising:
   attaching the storage compartment to a vehicle by means of a slide mechanism;
   moving the storage compartment from a first position to a second position in a direction substantially perpendicular to a line running along a length of the vehicle, the vehicle having a frame,
   wherein the slide mechanism removably attaches the storage compartment to the frame of the vehicle.

14. The method of claim 13, further comprising, after moving the storage compartment to the second position, opening a first lid of the storage compartment.

15. The method of claim 13, further comprising:
   opening a first lid of the storage compartment; and
   pivoting the first lid about 180 degrees.

16. The method of claim 15, further comprising, after the pivoting, supporting the first lid in the pivoted position.

17. The method of claim 13, further comprising moving the storage compartment from the second position to a third position in a direction substantially perpendicular to a line running along a length of the vehicle.

18. The method of claim 17, further comprising, after moving the storage compartment to the third position, opening a second lid of the storage compartment.

19. The method of claim 13, further comprising retaining the storage compartment in one of the first or the second positions.

20. The method of claim 19, further comprising locking the storage compartment in one of the first or the second positions.

* * * * *